(12) United States Patent
Bechevet et al.

(10) Patent No.: US 6,746,746 B2
(45) Date of Patent: Jun. 8, 2004

(54) LASER BEAM OPTICAL RECORDING MEDIUM FEATURING SEVERAL READ/WRITE LEVELS

(75) Inventors: Bernard Bechevet, Claix (FR); Romuald Paviet, Aime (FR); Robin Perrier, Grenoble (FR); Jean-Michel Bruneau, Teche (FR)

(73) Assignees: Commissariat a l'Energie Atomique, Paris (FR); MPO International, Averton (FR)

( * ) Notice: Subject to any disclaimer, the term of this patent is extended or adjusted under 35 U.S.C. 154(b) by 0 days.

(21) Appl. No.: 10/017,378

(22) Filed: Dec. 18, 2001

(65) Prior Publication Data

US 2002/0119278 A1 Aug. 29, 2002

(30) Foreign Application Priority Data

Dec. 19, 2000 (FR) .............................. 00 16570

(51) Int. Cl.$^7$ ................................ B32B 3/02
(52) U.S. Cl. .................... 428/64.1; 428/64.5; 428/64.6; 430/270.13
(58) Field of Search ............... 428/64.1, 64.4, 428/64.5, 646, 913; 430/270.13, 495.1, 945

(56) References Cited

U.S. PATENT DOCUMENTS

| | | | |
|---|---|---|---|
| 5,254,382 A | | 10/1993 | Ueno et al. |
| 5,754,516 A | | 5/1998 | Daval et al. |
| 5,817,389 A | * | 10/1998 | Ono .................... 428/64.1 |
| 5,923,581 A | | 7/1999 | Clerc et al. |
| 5,981,093 A | | 11/1999 | Bechevet et al. |
| 6,033,752 A | * | 3/2000 | Suzuki .................. 428/64.1 |
| 6,078,558 A | | 6/2000 | Bruneau et al. |
| 6,190,750 B1 | * | 2/2001 | Wierenga ............... 428/64.1 |
| 6,229,783 B1 | | 5/2001 | Bruneau et al. |
| 6,456,584 B1 | * | 9/2002 | Nagata ................ 369/275.2 |

FOREIGN PATENT DOCUMENTS

| | | |
|---|---|---|
| EP | 0 294 932 | 12/1988 |
| EP | 0 957 477 | 11/1999 |

OTHER PUBLICATIONS

Patent Abstracts of Japan, JP 11–126366, May 11, 1999.

* cited by examiner

Primary Examiner—Elizabeth Evans Mulvaney
(74) Attorney, Agent, or Firm—Oblon, Spivak, McClelland, Maier & Neustadt, P.C.

(57) ABSTRACT

The inventions relates to a laser beam optical recording medium which features several read/write levels, comprising a first half-transparent level and at least a second level, the first one being close to the laser transmitting source, each level comprising a phase changing material layer with two stable states controlled by a laser beam, where the phase changing material is a metallic alloy whose chemical formula writes as:

$$[(Ge_yTe_{1-y})_a(Sb_zTe_{1-z})_{1-a}]_{1-b}(In_{1-x}Te_x)_b$$

with:

$0.4 \leq y \leq 0.6$ $0.3 \leq z \leq 0.5$ $0.4 \leq x \leq 0.6$ $0.3 \leq a \leq 0.5$ $0.01 \leq b \leq 0.3$ the reflection coefficient of the first level being in the range from 10% to 30%, the transmission coefficient being at least 45%, the writing power being lower than 23 mW and the erasing power being lower than 10 mW.

5 Claims, 5 Drawing Sheets

LASER BEAM OPTICAL RECORDING MEDIUM FEATURING SEVERAL READ/WRITE LEVELS

DESCRIPTION

1. Technical Domain

The invention relates to a laser beam read/write multilayer recording medium. It more precisely relates to the use of an alloy made up of germanium, indium, antimony and tellurium as active layer material for a re-writable optical disc.

2. Prior Art

Two types of optical re-writable discs are now currently in use. The first type involves the phase change of a solid material from a crystal phase to an amorphous phase and from the amorphous phase to the crystal phase. The second type involves the magneto-optical properties of some materials, in particular the Kerr effect polarisation rotation of a light beam.

The phase change optical discs have been the object of extensive researches for several years. They apply the principle following which it is possible to make a material shift from the amorphous state to the crystal state according to the duration and intensity of a laser beam applied to its surface. Moreover this method permits to directly overwrite new information on the information already recorded. The active layer, i.e. the recording layer, of a phase change disc storing information includes amorphous sites spread inside a crystal matrix, these amorphous sites thus being the recorded binary information. Reading this information is performed following an optical method, which consists in using a read laser beam generally guided by a groove. The read beam sweeps the surface of the disc while staying focused on its surface. A reflected beam is then obtained, which is directed onto a detection device. As the amorphous sites reflectivity is generally lower than the crystal zones reflectivity, it is then possible to discriminate whether an amorphous site or a crystal zone is detected and consequently to extract information represented by the amorphous sites.

The phase changing materials generally involved in this application are chalcogenides GeSbTe, AgTnSbTe or also InSbTe. Selenides and tellurium oxydes may also be used. The required properties for this materials are the following:

- reversibility of two physical states (amorphous and crystalline),
- stability of these two states at ambient temperature (from −40° C. to +80° C.),
- an amorphisation time sufficiently low (about a few tens of nanoseconds),
- a crystallisation time sufficiently low (about a few tens of nanoseconds),
- a good stability in time and a good aptitude to endure cycling (defined as cyclability)
- a melting point not too high (about 600° C.).

These materials must be used in various conditions according to the kind of disc. For exemple, a CD–RW is used with a linear reading speed of 1.2 m/s, whereas a DVD-RAM is used with a linear reading speed of 6 m/s. It is then rare for a same material to be able to satisfy all these criteria, all the more since they are dependent. The minimum crystallisation time for example requires a particular composition.

During writing, the phase changing material is brought to its melting point, then endures a very quick annealing (about 10° C. by nanosecond). For a correct operation, the active layer is encapsulated (sandwiched) between two layers of dielectric materials which do not inter-react with the phase changing material.

The active area of a recording medium of this type comprises generally a piling up of a transparent substrate, a first dielectric layer which proves inert with respect to the phase changing material, a layer of the said phase changing material, a second dielectric layer playing the same part as the first dielectric one and finally a layer intended for reflecting the reading beam, this layer being also a heat sink. Intermediate layers are interleaved with the layers listed above which are used as diffusion screens. This arrangement is currently involved in the production of CD–RW, DVD–RAM, DVD–RW and DVD+RW.

Recent developments have permitted to realise optical discs with two recording levels comprising two piling-ups such as the above-described one. These piling ups carry out the same functions but one of them is semi-transparent. It is thus possible to read and write through the semi-transparent piling up.

FIG. 1 is a schematic transverse cross-section of a two-level read/write recording optical disc using a laser beam following the prior art. This recording medium is described in the document EP-A-0 810 590. The recording medium comprises a first level 10 and a second level 20, separated by a spacer 3, the whole being sandwiched between a first transparent substrate 1 and a second substrate 2. The presented recording medium is intended for being written and read through the transparent substrate 1.

The first recording level 1, closer to the emitting source of a read or write laser beam comprises, superimposed onto the transparent layer 1, a dielectric layer 11, a phase changing material layer 12, an optical interference layer 13, a semi-transparent heat dispersion layer 14 and another optical interference layer 16.

The second recording level 2, farther from the emitting source of a read or write laser beam comprises, superimposed onto the spacer 3, a dielectric layer 21, a phase changing material layer 22, another dielectric layer 23 and a reflective layer 24 also used as a heat sink.

In a two-layer optical disc, the second level (the farther from the laser source) is read through the first level (closer to the laser source). A phase changing recording level comprises at least one active absorbing layer. The absorption rate of a thin absorbing layer is often defined by the optical absorption coefficient k. The optical index of this layer currently writes under complex form: N=n−jk, n being the refraction index of the layer. In first approximation, the energy absorbed by the phase changing material layer is proportional to exp(−ke) where e is the layer thickness. To favour transmission through the first level 1, it is the necessary to limit the coefficient k of the active material of the first level.

The problem which arises is to find a phase changing material which permits a good transmission of the laser beam intended for reaching the phase changing material of another level.

The already cited document EP-A-0 810 590 discloses a two-level optical recording medium. The first level phase changing material is an alloy whose composition is $Ge_xTe_ySb_z$, with 10<x<55, 45<y<55, and 38<z<48 and x+y+z=100%.

The document U.S. Pat. No. 5,254,382 discloses an optical recording medium which features a phase changing material layer made up of an alloy of germanium, indium, antimony and tellurium. This alloy has been retained so as to improve the durability and writing speed for an optical recording medium only featuring one layer. This document does not deal with the transparency of the phase changing material layer and the possibility of using this alloy on the first layer of a multilayer optical recording medium.

The document JP-A-11-126 366 discloses a phase changing optical recording medium whose material retained for the record layer permits to solve signal instability problems (currently named "jitter"). This material is an alloy from the family GeInSbTe.

DESCRIPTION OF THE INVENTION

The present invention brings up a solution to the exposed problem, i.e. using a phase changing material which favours the transmission of a laser beam directed onto a phase changing material layer of another level.

The object of the invention is then a multilayer recording medium with several read/write levels per laser beam, comprising a first semi-transparent level and at least a second level, the first level being closer to the emitting source of the laser beam, each level comprising a phase changing material with two states reversible under the action of the laser beam, characterised in that the phase changing material of the first level is an alloy whose formula is $$[(Ge_yTe_{1-y})_a(Sb_zTe_{1-z})_{1-a}]_{1-b}(In_{1-x}Te_x)_b$$

with:

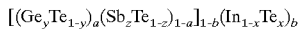

$0.4 \leq y \leq 0.6$ $0.3 \leq z \leq 0.5$ $0.4 \leq x \leq 0.6$ $0.3 \leq a \leq 0.5$ $0.01 \leq b \leq 0.3$ The first level proving a reflectivity between 10% and 30%, a transmittance at least equal to 45%, a write power lower than 23 mW and an erase power lower than 10 mW.

Advantageously, the first level phase changing material layer is sandwiched between two confinement layer. Preferably, the two confinement layer are made up of materials such as ZnS—SiO$_2$, SiO$_2$, Si$_3$N$_4$ and GeN. Advantageously, the phase changing layer is at least 6 nanometres thick and the confinement layers are about 80 nanometres thick.

BRIEF DESCRIPTION OF DRAWINGS

The invention will be well understood and other advantages and particularities thereof will appear when reading the following description, in no way limiting the scope of the invention, illustrated with the following figures.

DETAILED DESCRIPTION OF PREFERRED EMBODIMENTS OF THE INVENTION

The phase changing material retained for the first recording level of a multilayer optical recording medium following the invention, is an alloy whose chemical formula is as follows:

$$[(Ge_yTe_{1-y})_a(Sb_zTe_{1-z})_{1-a}]_{1-b}(In_{1-x}Te_x)_b$$

with:

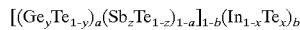

$0.4 \leq y \leq 0.6$ $0.3 \leq z \leq 0.5$ $0.4 \leq x \leq 0.6$ $0.3 \leq a \leq 0.5$ $0.01 \leq b \leq 0.3$ This alloy features an extinction coefficient lower than for the alloys which are currently involved in this type or recording medium. When used on the first level of a two-layer recording medium, it thus permits an easy writing on the second level.

To make a comparison, Table I gives the optical indices n and k at 650 nanometres, for the amorphous and crystalline phases, for various combinations GeInSbTe following the invention whereas Table II gives the values of the same indices for various combinations of the prior art.

TABLE I

| Composition | Ge$_{23}$In$_4$Sb$_{21}$Te$_{52}$ | Ge$_{22}$In$_9$Sb$_{18}$Te$_{51}$ | Ge$_{22}$In$_{14}$Sb$_{16}$Te$_{48}$ |
|---|---|---|---|
| n amorphous | 3.65 | 3.62 | 3.60 |
| k amorphous | 1.34 | 1.20 | 1.15 |
| n crystalline | 3.71 | 3.06 | 2.88 |
| k crystalline | 2.38 | 2.67 | 2.12 |

TABLE 2

| Composition | $Ge_{23}Sb_{23}Te_{55}$ | $Ag_{12}In_7Sb_{55}Te_{26}$ | $IN_{50}Sb_{17}Te_{33}$ |
|---|---|---|---|
| n amorphous | 3.70 | 3.90 | 3.40 |
| k amorphous | 1.60 | 2.30 | 1.40 |
| n crystalline | 3.90 | 3.50 | 3.60 |
| k crystalline | 4.10 | 3.40 | 0.90 |

Figure 1:
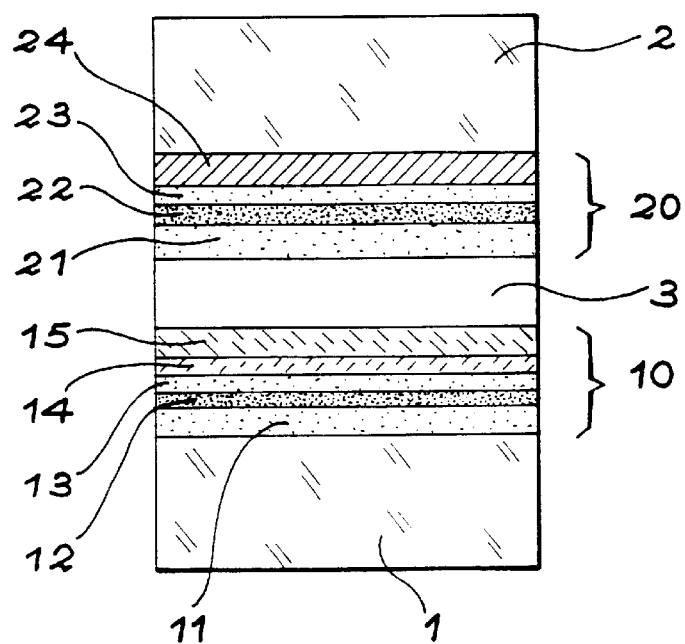
FIG. 1, already described, is a transverse schematic cross-section of a two-layer read/write recording medium using a laser beam according to the prior art.
Figure 2:
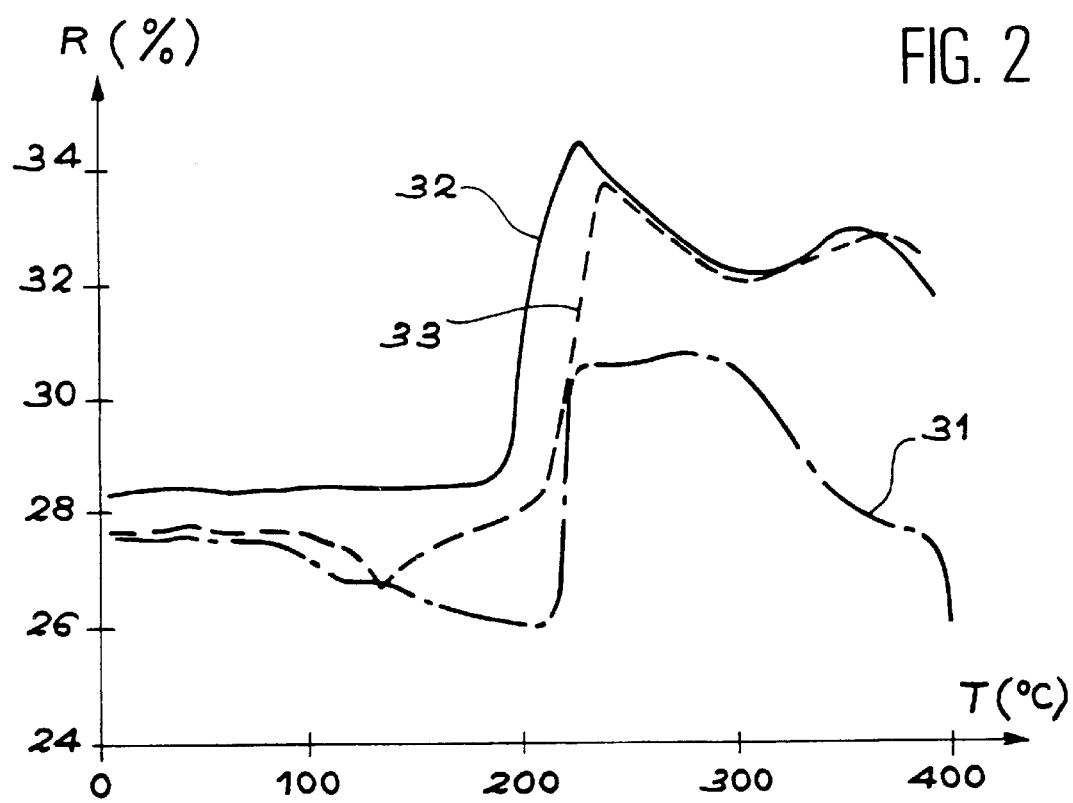
FIG. 2 is a diagram detailing the variations of reflectivity in terms of the temperature for various compositions of a phase changing material used in the first recording level of a multilayer optical recording level following the invention, FIG. 3 details the structure of discs used for recording static tests of a recording level comprising a phase changing material intended for the first level of recording of a multilayer optical recording medium following the invention.

The diagram on FIG. 2 represents the variation of the reflectivity R in terms of temperature for various phase changing materials whose formulae are detailed in Table I. The curves of the diagram on FIG. 2 have been recorded for thin layers which are 200 nanometres thick, deposited on a silicon substrate. The curve 31 corresponds to the composition $Ge_{23}In_4Sb_{21}Te_{52}$, the curve 32 corresponds to the composition $Ge_{22}In_9Sb_{18}Te_{51}$, the curve 33 corresponds to the composition $Ge_{22}In_{14}Sb_{16}Te_{48}$.

Figure 3:
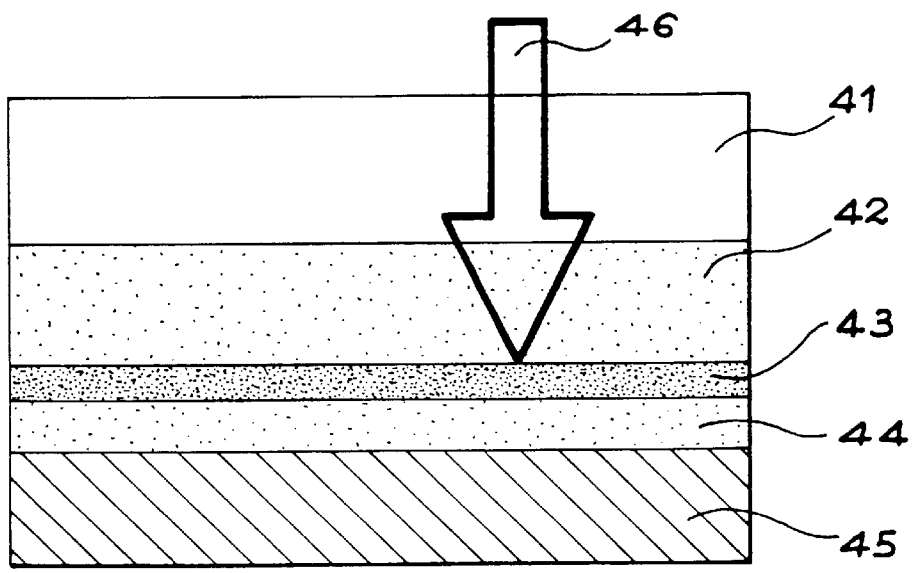

FIG. 3 details, along a transverse cross-section, the structure of discs used for static tests of a recording level following the invention. The structure comprises a glass substrate 41 on which are sequentially deposited: one dielectric layer of ZnS—SiO$_2$ whose thickness is 100 nanometres, a layer 43 made up of a phase changing material whose thickness is 20 nanometres, a dielectric layer ZnS—SiO$_2$ whose thickness is 30 nanometres and an aluminum layer whose thickness is 80 nanometres, which plays the part of a reflector. The arrow 46 represents a laser beam focused onto the layer 43 and used for performing the tests which are described in the following.

Figure 4:
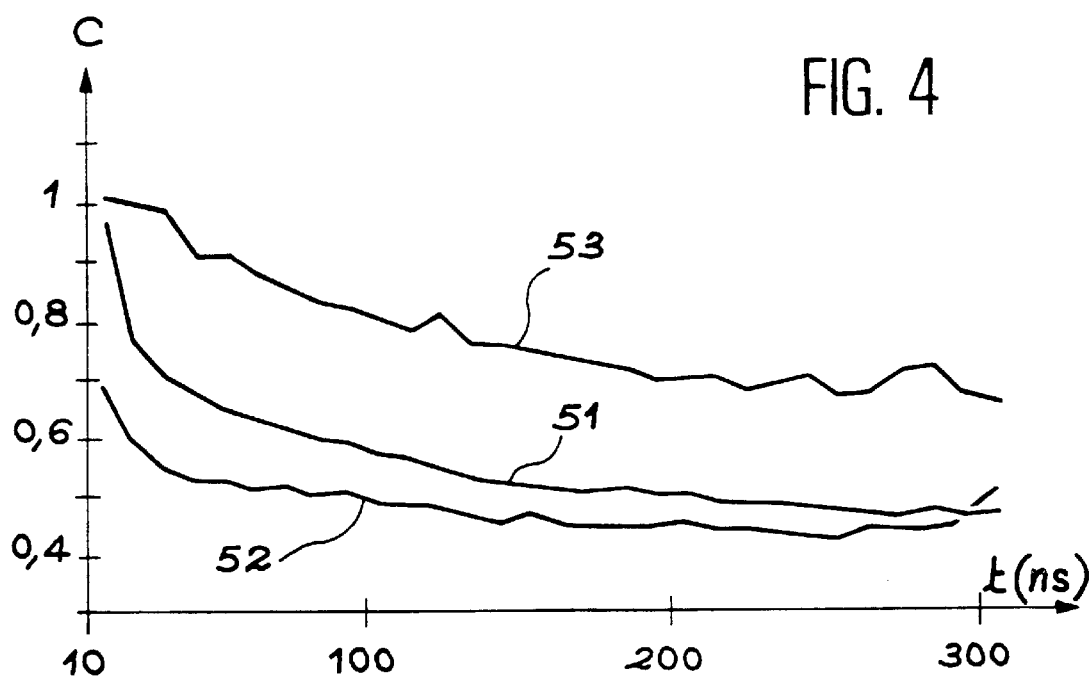
FIG. 4 is a diagram detailing the evolution of contrast in terms of the write pulse duration time for various compositions of a phase changing material used in the first recording level of a multilayer optical recording level following the invention.

The diagram on FIG. 4 represents the variation of contrast C (reflectivity R divided by the crystalline reflectivity Rc) in terms of the write pulse duration. The write power was 15 mW. The curve 51 corresponds to the composition $Ge_{23}In_4Sb_{21}Te_{52}$, the curve 52 corresponds to the composition $Ge_{22}In_9Sb_{18}Te_{51}$, the curve 53 corresponds to the composition $Ge_{22}In_{14}Sb_{16}Te_{48}$.

Figure 5:
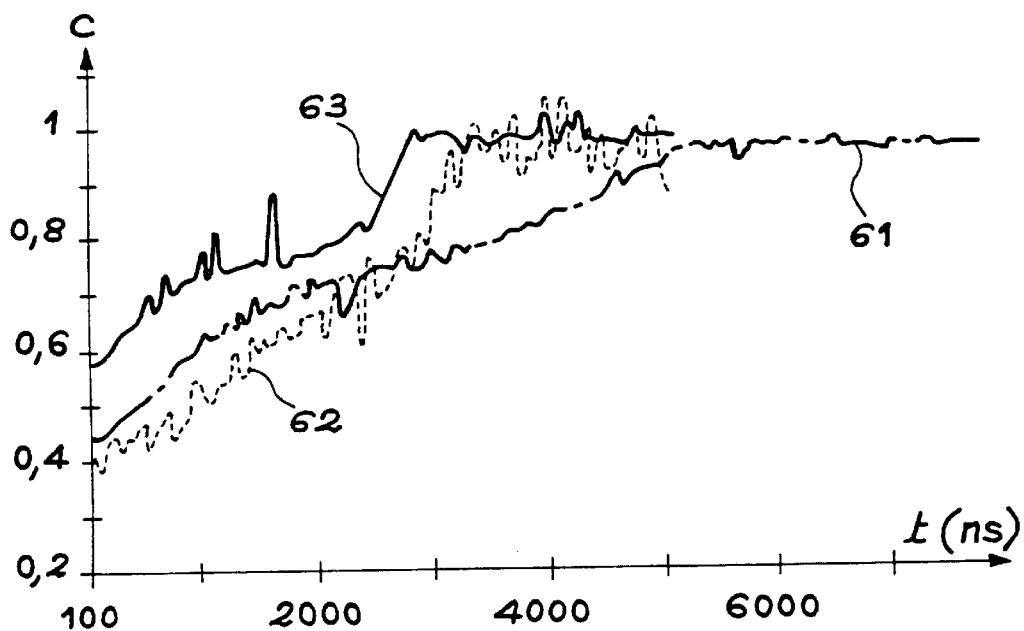
FIG. 5 is a diagram detailing the evolution of contrast in terms of the erase pulse duration time for various compositions of a phase changing material used in the first recording level of a multilayer optical recording level following the invention.

The diagram on FIG. 5 represents the variation of contrast C in terms of the erase pulse duration. The writing parameters were 15 mW for 200 nanoseconds. The curve 61 corresponds to the composition $Ge_{23}In_4Sb_{21}Te_{52}$, the curve 62 corresponds to the composition $Ge_{22}In_9Sb_{18}Te_{51}$, the curve 63 corresponds to the composition $Ge_{22}In_{14}Sb_{16}Te_{48}$.

Figure 6:
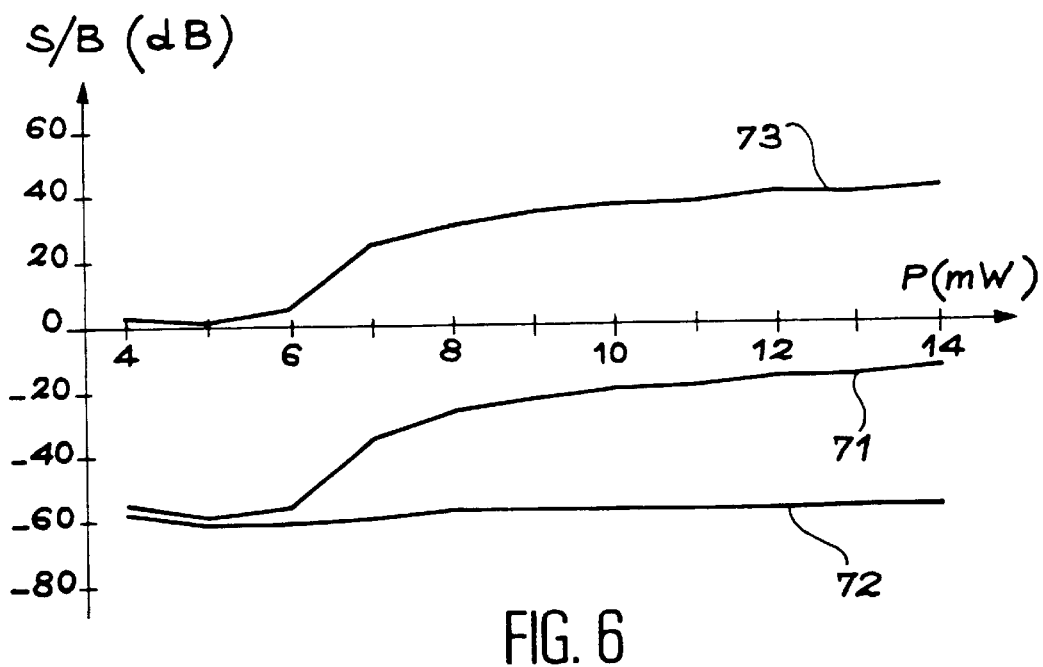
FIG. 6 is a diagram detailing the evolution of the signal to noise ratio in terms of the write power for the first recording level of a multilayer optical recording medium following the invention.

The diagram on FIG. 6 represents the variation of the signal to noise ration S/B (S/N in English) in terms of the write power. The curve 71 corresponds to the signal, the curve 72 corresponds to noise and the curve 73 to the signal to noise ration.

Figure 7:
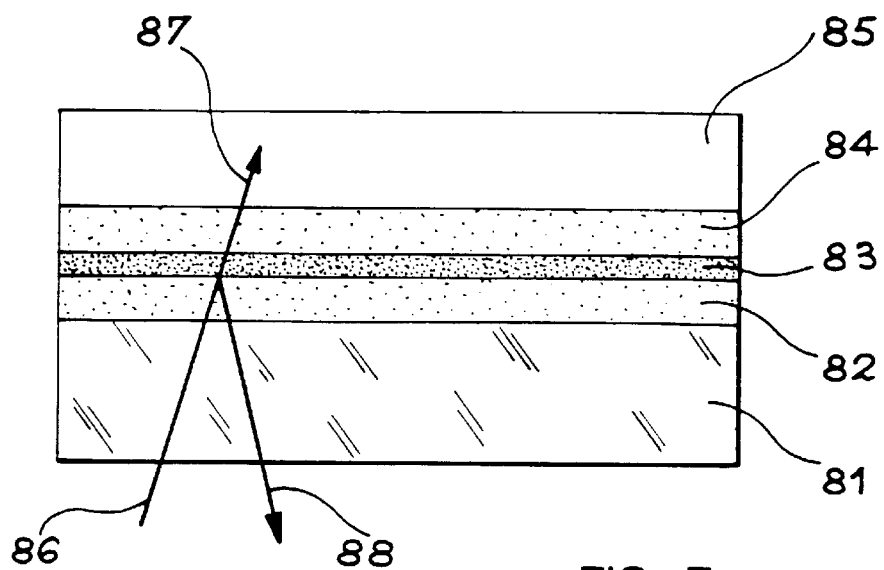
FIG. 7 presents a structure of the first recording level of a multilayer optical recording level following the invention, FIGS. 8, 9 and 10 detail respectively the values of reflectivity, transmittance and absorption in terms of the thickness of dielectric confinement layers of a phase changing material layer intended for the first recording level of a multilayer optical recording medium following the invention.
Figure 8:
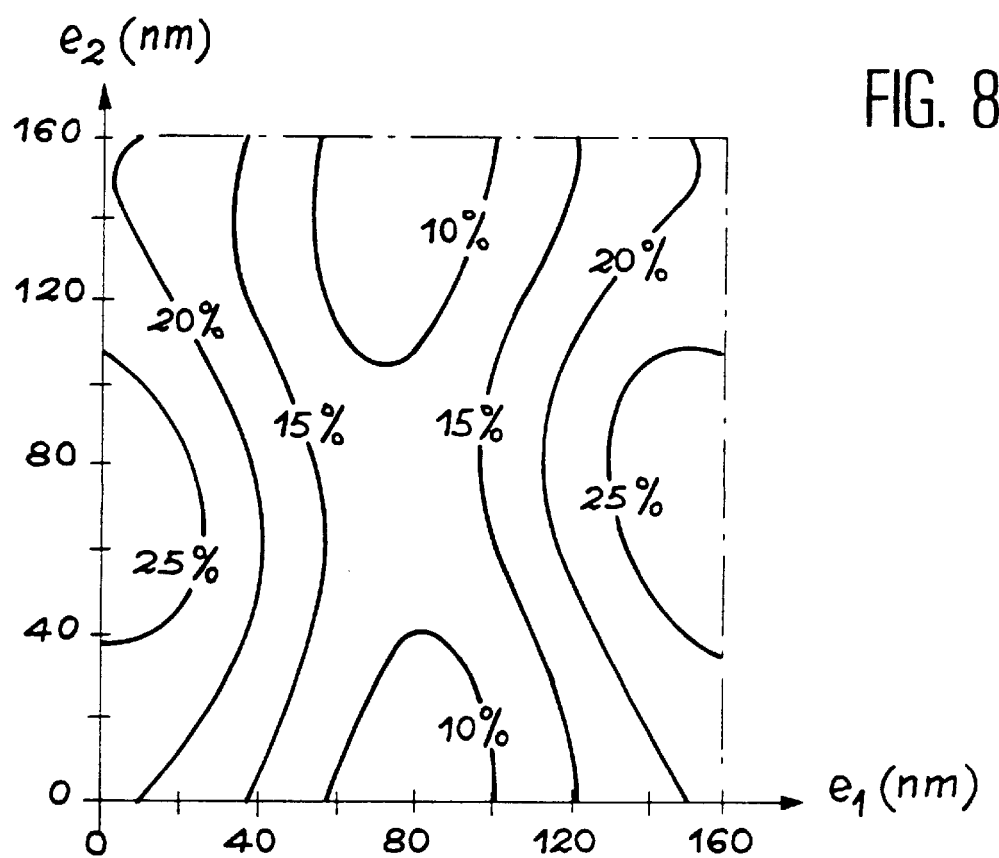

The FIG. 7 displays, in cross-section, a first recording level structure deposited on a transparent substrate 81. On the substrate 81 are sequentially deposited an $e_1$ thick dielectric layer 82, a phase changing material layer 83 following the invention, an $e_2$ thick dielectric layer 84 and a layer 85 playing the part of spacer. The phase changing material layer 83 is 20 nanometres thick. A laser beam 86 is focussed onto the phase changing material layer 83, which yields a transmitted beam 87 and a reflected beam 88.

Reflectivity, transmission and absorption measurement have been carried out on this structure for various values of thickness $e_1$ and $e_2$. Iso-transmission curves have been plotted for 10%, 15%, 20% and 25% values of reflectivity.

Figure 9:
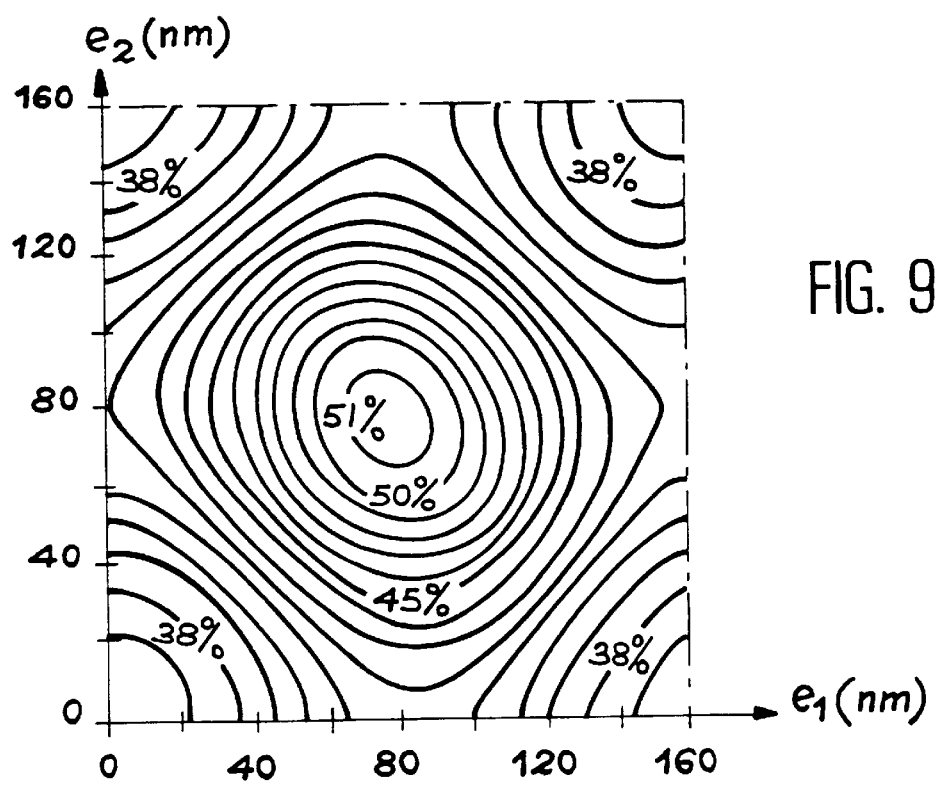

FIG. 9 gives the transmissibility of the structure in terms of thickness $e_1$ and $e_2$. The iso-transmission curves have been plotted from 38% to 51% by 1% steps.

Figure 10:
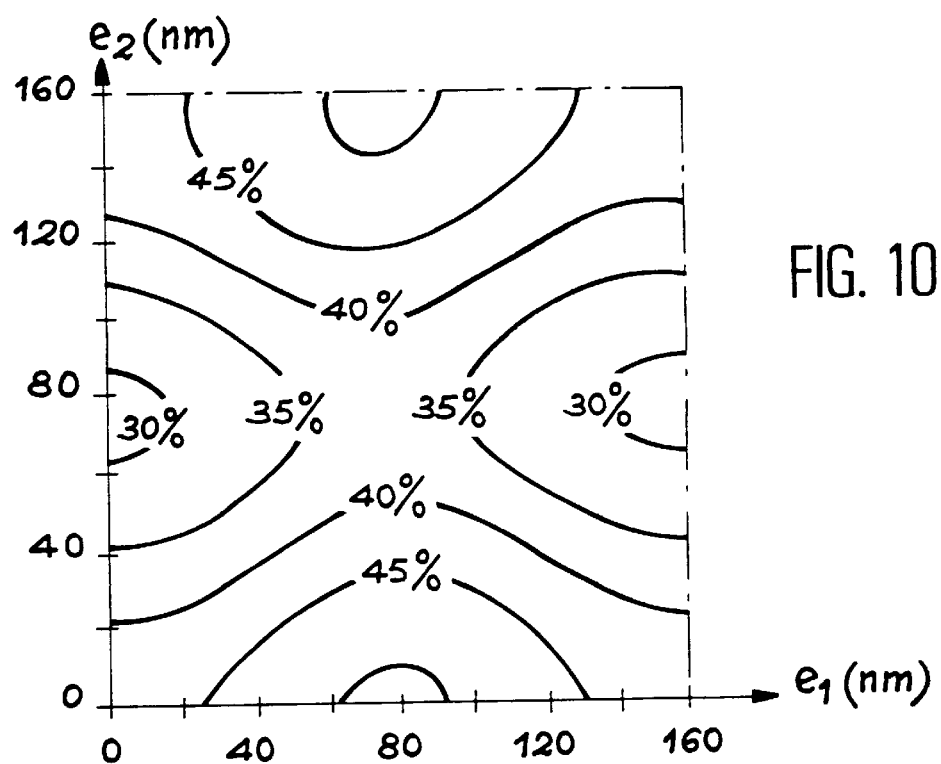

FIG. 10 represents the absorption of the structure in terms of thickness $e_1$ and $e_2$. The iso-absorption curves have been plotted for 30%, 35%, 40% and 45% values of reflectivity.

These plots show that thickness $e_1$ and $e_2$ nearing $\lambda/4n$ permit to optimise transmission, which favours writing and reading onto the second level.

For the above described cases, it is advantageous to retain thickness $e_1$ and $e_2$ values equal to 80 nanometres.

The parameters relating to the deposits required for obtaining the above described structures by means of co-pulverisation, with a structure made up of $Ge_{22}In_9Sb_{18}Te_{51}$ are the following:

limit vacuum of the depositing unit: $2.10^{-4}$ mbar, argon flow during the deposit of the aluminum layer: 40 cm$^3$/minute (normal conditions), pressure during aluminum layer deposit: $3.10^{-3}$ mbar, argon flow during the deposit of the Zns—SiO$_2$ layer: 40 cm$^3$/minute (normal conditions), pressure during ZnS—SiO$_2$ layer deposit: $6.10^{-3}$ mbar, argon flow during the deposit of the phase changing material layer: 40 cm$^3$/minute (normal conditions)

pressure during the deposit of the phase changing material layer: $4.10^{-3}$ mbar, power applied to the GeTe target corresponding to 100 mA, power applied to the InTe target corresponding to 100 mA, power applied to the SbTe target corresponding to 50 mA.

The parameters involved for disc initialisation are the following:

vernier distance: 11.64 mm, laser intensity: 700 mA, spot diameter: 30 µm, overlapping: 10 µm, linear speed: 3 m/s.

The invention has applications in the domain of optical disc recording, for example DVD–RAM, DVD–RW, DVD+RW or double-level CD–RW. The disclosed alloy also permits to realise optical disks which may perform recording on a number of levels larger than 2.

What is claimed is:

1. A laser beam optical recording medium having several read/write levels, comprising a first semi-transparent level and at least a second level, the first level being close to the laser transmitting source, wherein each level comprises a phase changing material layer with two stable states controlled by a laser beam, and wherein the phase changing material layer of the first level is an alloy of the formula:

$$[(Ge_yTe_{1-y})_a(Sb_zTe_{1-z})_{1-a}]_{1-b}(In_{1-x}Te_x)_b$$

wherein $0.4 \leq y \leq 0.6$ $0.3 \leq z \leq 0.5$ $0.4 \leq x \leq 0.6$ $0.3 \leq a \leq 0.5$ $0.01 \leq b \leq 0.3$, and wherein the first level has a reflection coefficient in the range from 10% to 30%, a transmission coefficient at least 45%, a writing power lower than 23 mW and an erasing power lower than 10 mW.

2. The optical recording medium of claim 1, wherein the phase changing material layer of the first level is sandwiched between two confinement layers.

3. The optical recording medium of claim 2, wherein the two confinement layers are selected from the group consisting of $ZnS$—$SiO_2$, $SiO_2$, $Si_3N_4$ and GeN.

4. The optical recording medium of claim 1, wherein the phase changing material layer has a thickness of at least 6 nm and the confinement layers have a thickness about 80 nm.

5. The optical recording medium of claim 1, wherein the phase changing material layer of the first level is $Ge_{23}In_4Sb_{21}Te_{52}$, $Ge_{22}In_9Sb_{18}Te_{51}$ or $G_{22}In_{14}Sb_{16}Te_{48}$.

* * * * *